Feb. 9, 1971          L. G. ST. DENNY          3,562,066

DIE STRUCTURE FOR HOT STAMPING MACHINE

Filed April 28, 1967          2 Sheets-Sheet 1

INVENTOR:
LLOYD G. ST DENNY,

BY *Julius Zukalicky*
HIS ATTORNEY.

Feb. 9, 1971 L. G. ST. DENNY 3,562,066
DIE STRUCTURE FOR HOT STAMPING MACHINE
Filed April 28, 1967 2 Sheets-Sheet 2
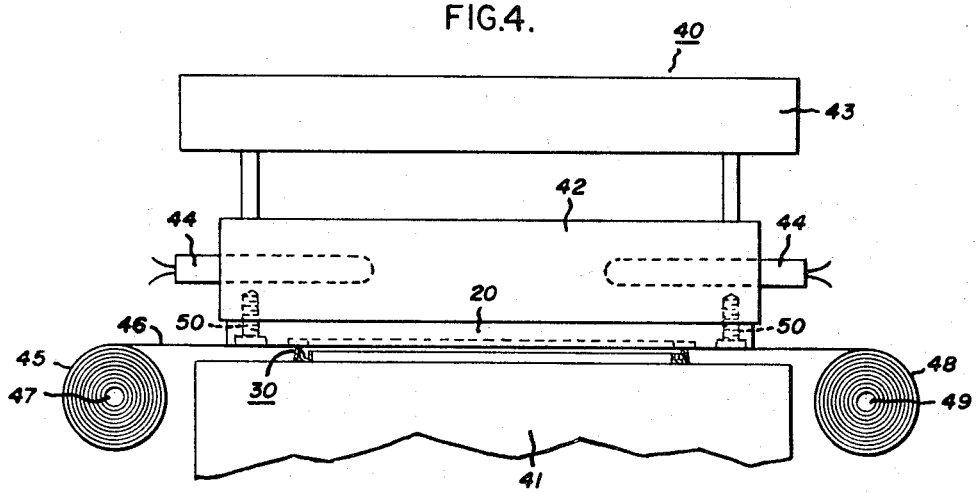
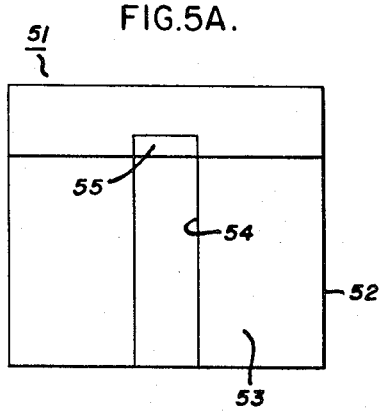
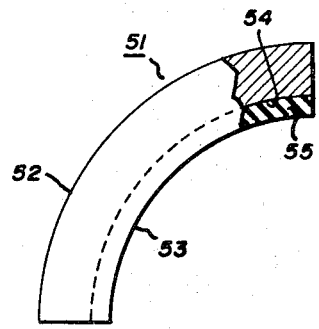
INVENTOR:
LLOYD G. ST DENNY,
BY
HIS ATTORNEY.

United States Patent Office 3,562,066
Patented Feb. 9, 1971

3,562,066
DIE STRUCTURE FOR HOT STAMPING MACHINE
Lloyd G. St. Denny, Camillus, N.Y., assignor to General Electric Company, a corporation of New York
Filed Apr. 28, 1967, Ser. No. 634,744
Int. Cl. B32b 31/20, 31/10
U.S. Cl. 156—515
5 Claims

ABSTRACT OF THE DISCLOSURE

A die structure for use in a hot stamping machine for providing heat and pressure to a work piece comprising a metal plate having a surface contour conforming to the contour of the work piece and a heat conducting resilient material molded in and contained within a depression in the plate.

BACKGROUND OF THE INVENTION

Hot stamping machines are commonly used in the industry for hot stamping decorative designs, indicia and the like from a strip of leaf material onto a work piece, for example the front portion of a plastic television cabinet.

Such machines include a stationary work table on which the work piece is placed and a moveable head or platen which is capable of being heated and on which the die structure having a pad of heat conducting resilient material of a surface configuration matching the surface disposition of the areas of the work piece is secured in good heat conducting relationship. The strip of leaf material is supported between the die structure and the work piece by a supply reel and a take up reel. The strip of leaf material is multi-layer in structure and may comprise successive layers of a Mylar base, a release agent, a tint or pigment layer, a tint backing layer and a sizing or adhering layer. The strip is positioned with the adherent layer immediately adjacent to the elevated areas of the work piece.

To perform a stamping operation the moveable head heated to predetermined range of temperature is caused to contact the strip against the areas of the work piece to be stamped or decorated with a predetermined range of pressure for a predetermined time. The combination of temperature and pressure causes the tint material and the backing layer of the leaf material to be adhered to the desired areas of the work piece and to be released from the Mylar base. Withdrawal of the moveable head and advancing of the used strip material to the take up reel readies the machine for the next stamping operation of another work piece.

Heretofore, the die structure consisted of a metallic plate to the surface of which was mechanically secured the metal backed pad of heat conducting resilient material, for example by means of screws. Such structures have a number of disadvantages. As the metal backed pad of die material is secured at discrete points along the metal backing, heat conduction from the plate to the metal backed die material is not uniform, being good at the discrete fastening points and poor at other points thereby providing a nonuniform heat input over the pad of die material. When an adhesive is used between the metal backing of the die material and the base plate or platen, buckling of the contact would give raise to the same problems as use of screw fasteners. Also, with such structure as very little lateral support is provided to the sides of the pad of die material pressure is not uniformly distributed over the work piece. As both uniform pressure and temperature within a predetermined range is essential for good quality stampings, consistent good quality of stampings are difficult to achieve. Also, with such an arrangement it is necessary to use thin pads of resilient material in order to provide the desired heat conduction through the die material to the strip of leaf material and work piece. Such thin dies wear out quickly requiring the heat conducting material to be frequently replaced, i.e., the die structure to be rebuilt. Also, as the die material extends above the surface of the support plate, the edges thereof become easily damaged by insertion and removal of the work pieces from the press further substantially limiting the useful life of the die material. Also, such prior art die structures were more or less limited to use with planar surface as mechanical securing of the sheets of die material to the supporting plate resulted in creases and folds in the heat conducting resilient material with resultant uneveness in surface contour. Further, in view of the fact that heat conduction from the plate to the resilient material is over one surface of the material, higher temperatures have to be provided to the plate to assure proper temperature at the areas of contact of the material to the work piece through the foil. Such a structure increased the heat recovery time of the pad thereby increasing the cycling time of a stamping.

The present invention is directed to overcoming limitations and disadvantages in prior art structure such as pointed out above.

An object of the present invention is to provide a die structure for hot stamping a work piece which enables uniform temperature and pressure to be applied to the work piece with excellent control of such parameters.

Another object of the present invention is to provide a die structure which is in good heat conducting relation to the plate to which it is secured.

Another object of the present invention is to provide a die structure which will perform highly effectively on surfaces having contours other than planar.

Another object of the present invention is to provide a die structure which has rapid heat recovery.

Another object of the present invention is to provide a die structure for a hot stamping machine which is economical to make and which is rugged enabling it to be used for considerably longer periods of time before requiring replacement or rebuilding.

Another object of the present invention is to provide a die structure for a hot stamping machine in which the heat conducting resilient material can be of greater thickness than heretofore possible without imparing the heat transfer characteristics thereof.

SUMMARY OF THE INVENTION

Such objects of the invention are achieved in a die structure for a hot stamping machine by the provision of a metallic supporting plate having the desired contour and having a depression of the desired extent over such contour, and a heat conducting resilient material molded in the depression.

The novel features believed characteristic of the invention are set forth in the appended claims. The invention itself together with further objects and advantages thereof may best be understood by reference to the following description taken in connection with the accompanying drawings in which:

FIG. 4 is a front view of a portion of a hot stamping machine showing how the die structure of FIGS. 2A and 2B is used therein;

FIG. 5A is a bottom view of a die structure having a concave contour for use with work pieces having a matching contour; and FIG. 5B is a partly broken left end view of the structure shown in FIG. 5A.

Figure 1A:
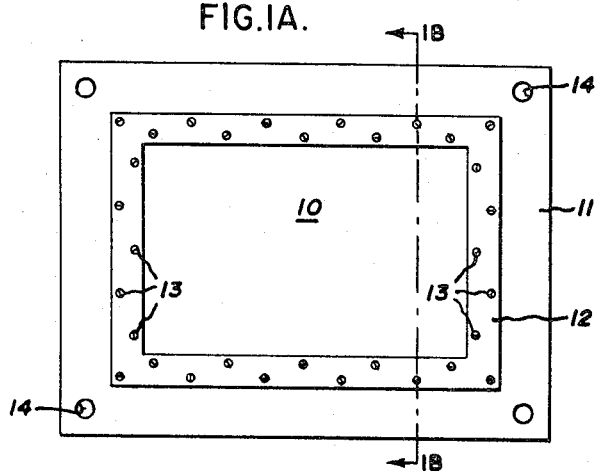
FIG. 1A shows a bottom plan view of a prior-art die structure.
Figure 1B:
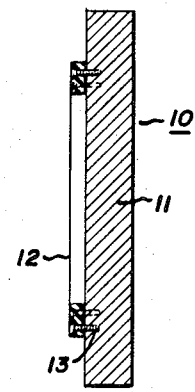
FIG. 1B is a sectional view taken along line 1B—1B of FIG. 1A.

Referring now to FIGS. 1A and 1B there is shown a die structure 10 consisting of a metallic plate 11, for example aluminum, on which is secured a metal backed pad 12 of heat conducting resilient material, for example GE 24116 silicone rubber compound, made and sold by the Silicone Products Department of the General Electric Company located at Waterford, N.Y. The resilient material is in the form of a rectangular loop which preferably is cut from a large sheet to avoid joints in the surface structure thereof which would mar the continuity of a hot stamping. The pad 12 is secured to the plate 11 by means of a plurality of screw fasteners 13 recessed in the metal backed pad, or by means of a metal-to-metal heat seal adhesive. In order to provide good heat transfer the resilient pad is made fairly thin, for example of the order of one-eighth of an inch. The plate 11 is provided with holes 14 for securing the plate to the moveable head of a hot stamping machine. Such a die structure is suitable for hot stamping a tint or finish to lines or raised areas in the front face of a plastic television cabinet, for example.

As pointed out above such a pad has a number of disadvantages. Because of its thinness and because it extends above the surface of the plate it has limited life and requires continuous rebuilding. Because of the lack of lateral support in the pad, pressure applied thereby to the work piece is not uniformly distributed. While the conductive contact of the metal backed pad with the plate in the vicinity of the fasteners is good, in other places the conductive contact is not very satisfactory. Accordingly, the application of heat and pressure from the pad to the work piece is not uniform with the result that the hot stamping process is not carried out to optimum. Good adherence of tint of the strip or leaf material to the work piece requires temperature and pressure control within certain narrow ranges which are not readily obtained by the die structure of FIGS. 1A and 1B. In addition the pad of FIGS. 1A and 1B is subject to damage by repeated usage.

Figure 2A:
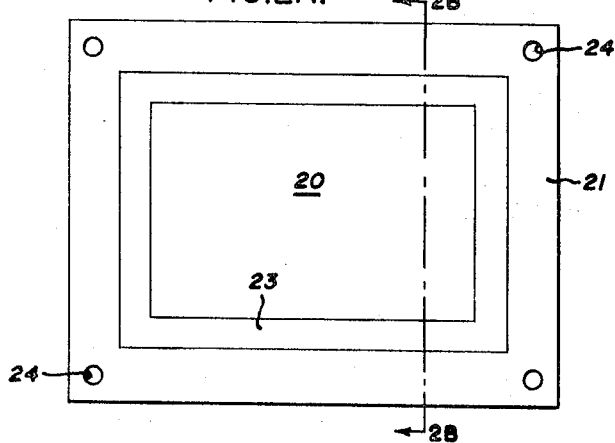
FIG. 2A shows a bottom plan view of a die structure embodying the present invention.
Figure 2B:
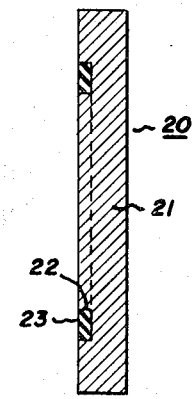
FIG. 2B is a sectional view taken along line 2B—2B.

Referring now to FIGS. 2A and 2B there is shown a die structure 20 provided in accordance with the present invention comprising a plate 21, for example of aluminum, having a depression or channel 22 and a pad 23 of heat conducting resilient material, for example GE silicone compound No. 24116, embedded within the channel. The die structure 20 shown is for the same purpose as that shown in FIGS. 1A and 1B, namely for providing the means of transfer of heat and pressure to cause the adhesion of the decorative tint in the form of pigment on raised lines of the front face of a television cabinet. The die structure is formed by first milling the channel 22 shown in the form of a rectangular loop in upper surface of the plate 21. The channel may extend to any depth desired. It could be of the same depth as the thickness of the pad 12 of FIGS. 1A and 1B. Preferably, it is made thicker so as to accommodate large variations in irregularities in the lines of the elevated areas of the work piece and to provide longer life. It, of course, can be made thinner for specialized applications. The width of the pad 23 need not be as great as the width of the pad 12 in FIGS. 1A and 1B. Holes 24 are provided in the plate 21 for securing it to a hot stamping machine. The aforementioned silicone compound, or any other suitable heat conducting resilient material, is poured in liquid form into the channel 22 of plate 21, which previously has been cleaned and prepared, and is allowed to set under conditions of temperature and pressure so as to securely adhere it to the bottom and side walls of the channel. As the die structure 20 of FIGS. 2A and 2B uses only material actually needed, waste of the expensive heat conducting resilient material such as the silicone compound mentioned is kept to a minimum. The pad 23 makes conductive contact with the plate 21 on three sides of the channel 22 thereby providing good heat transfer from the plate to the pad with resultant fast heat recovery of the pad. The pad 23 has lateral support thereby providing uniform pressure over the width of the pad. Also, as the pad is flush with the surface of the plate it is substantially free from damage resulting from the insertion and removal of work pieces in relation thereto. If desired for certain applications it will be appreciated that the resilient material may extend slightly above the surface of the channel.

It has been found that the pad of FIGS. 2A and 2B is not only cheaper to fabricate but lasts considerably longer than the pads of FIGS. 1A and 1B. If desired, the depth of the pad can be increased as need be without impairing its effective operation. By virtue of the fact that heat and pressure are applied uniformly over the entire surface of the pad to the work piece the stamping process can be much more satisfactorily controlled than the pad of FIGS. 1A and 1B. Once the pad becomes worn the rebuilding is very easily accomplished by simply removing the heat conducting resilient material from the channel 22 and casting or embedding new material therein.

Figure 3A:
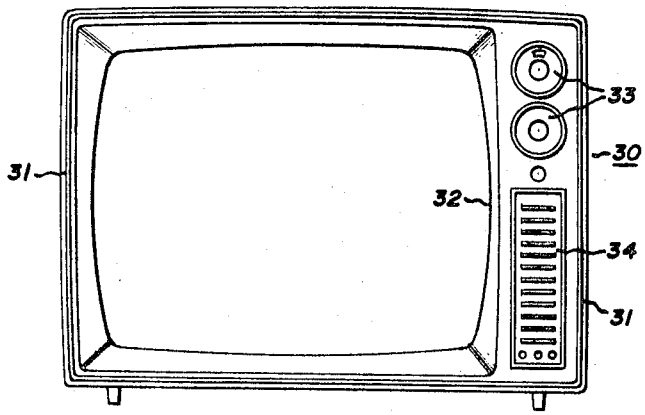
FIGS. 3A and 3B show respectively a front view and a side view of the front portion of the cabinet of a television receiver useful in explaining how the invention is applied.
Figure 3B:
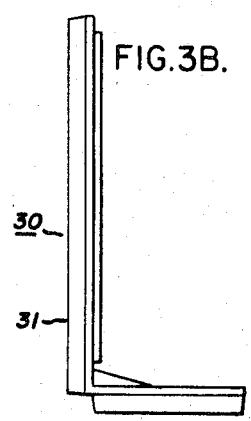

Referring now to FIGS. 3A and 3B there is shown the front portion 30 of a cabinet made of plastic material, for example high impact polystyrene, having a raised rectangular ridge or line 31 in outline on which it is desired to provide decorative tint. The front portion 30 includes an opening 32 for the picture tube and also includes openings 33 for the controls, and further includes a raised decorative portion 34 in the lower right end corner thereof.

Referring now to FIG. 4 there is shown a portion of a hot stamping machine 40 (with a work piece in position and pressure and heat being applied to the workpiece) including a stationary table 41 and a metallic head 42 moveable downward toward table 41 by mechanism 43 to provide pressure to work pieces located on the work table. The moveable head can be heated to predetermined range temperatures by means of electric heaters 44. A supply roll 45 of foil or hot stamping leaf material 46 is provided on a supporting shaft 47 on one side of the machine. The leaf material 46 is drawn through the region between the table 41 and moveable head 42 and wound on take up reel 48 supported on shaft 49. The roll leaf material 46 may be any of a number of materials suitable for the work piece to be stamped. For a plastic work piece the leaf material made by Admiral Coated Products of Hackensack, New Jersey may be used, for example their Type B Leaf may be used as specified in their Roll Leaf Guide. The multilayer leaf material consists of a Mylar base adjacent the die structure, a layer of wax type release material, a layer of pigment and backing, followed by a layer of adhesive or sizing material for adhering the pigment and backing to the work piece. The die structure 20 of FIG. 2A and 2B is secured by bolts 50 in the holes 24 thereof to the under side of the moveable head 42 to provide good heat conducting contact therewith with the pad 23 portion facing downward. Of course, the resilient material 23 of die structure 20 registers with the lines 31 of work piece 30.

To perform the stamping operation the work piece 30 shown as the front portion of the cabinet of the television receiver of FIGS. 3A and 3B is inserted in between the leaf material and the work table with the raised lines 31 facing the strip. The moveable head is heated and lowered to impact and apply pressure of predetermined amount to bear the strip against the raised line 31 causing pigment material to be adhered to the work piece and released from the Mylar base material for a predetermined time. The moveable head is then retracted and the work piece is removed. The strip is advanced so as to bring a new strip into position in readiness for another hot stamping operation to another work piece. The above mentioned type B foil used with a resilient die on high impact polystyrene requires a temperature of about 380 degrees and a medium pressure and dwell time, for example 60 pounds and two seconds.

Referring now to FIGS. 5A and 5B there is shown a die structure 51 suitable for use with a surface other than flat and in particular with a concave surface. The die structure consists of a plate 52 having a concave surface 53 adapted to match the convex surface of a work piece which it is desired to hot stamp. A groove or channel 54 is provided in the concave surface for the heat conducting resilient material 55. In the fabrication of the die structure the groove 54 may be dammed and the heat conducting resilient material in liquid form poured into the groove and allowed to set. The surface of the pad so formed has, in addition to having the other advantages mentioned in connection with the die structures of FIGS. 2A and 2B, the advantages of enabling hot stamping to be provided to curved surfaces. While a particular type of curved surface has been shown, it will be appreciated that surfaces of any desired curvature may be made.

While the invention has been described in specific embodiments, it will be appreciated that many modifications may be made by those skilled in the art and we intend by the appended claims to cover all such modifications and changes as fall within the true spirit and scope of the invention.

What I claim as new and desire to secure by Letters Patent of the United States is:

1. A die structure for a hot stamping machine adapted to be heated and to press a strip of material against an area of a work piece to cause a part of said strip to adhere to said work piece comprising a metallic plate having a depression therein, a heat conducting resilient material cast in said depression in secure bond to said plate, said depression acting to maintain the configuration of said heat conducting resilient material, the exposed portion of said heat conducting resilient material being the only portion of said die structure adapted to engage a strip of material against an area of a work piece and transfer heat to the strip of material to cause preselected portions of the strip of material to adhere to the area of said work piece.

2. The structure of claim 1 in which the exposed surface of said heat conducting resilient material has a contour matching the surface contour of said area of said work piece.

3. The structure of claim 1 in which the side portions of the heat conducting resilient material are in intimate bond with the corresponding side portions of the depression of said plate.

4. The structure of claim 1 in which the depth of said depression is small in relation to the lateral extent thereof and in which the heat conducting resilient material has sufficient depth to accommodate appreciable irregularities in said area of said work piece yet provide good pressure contact and good heat conduction relation therewith.

5. A die structure for a hot stamping machine adapted to be heated and to press a leaf of multi-layer material against an elevated area of a work piece to cause a predetermined layer of said leaf to adhere to said elevated area of said work piece comprising a metallic plate having a recess therein, a heat conducting resilient material embedded in said recess in secure mechanical contact and in good heat conducting relation with said plate, said recess acting to maintain the configuration of said heat conducting resilient material, the exposed portion of said heat conducting resilient material extending to the surface of said plate and being the only portion of said die structure adapted to engage said leaf of material against said elevated area to cause preselected portions of said leaf of multi-layer material to adhere to said elevated area of said work piece.

References Cited

UNITED STATES PATENTS 3,244,573  4/1966  Raffaelli _____ 156—515X

BENJAMIN A. BORCHELT, Primary Examiner

J. M. HANLEY, Assistant Examiner

U.S. Cl. X.R.

156—251, 513